(12) United States Patent
Cheriton

(10) Patent No.: US 9,047,334 B1
(45) Date of Patent: Jun. 2, 2015

(54) MERGE-UPDATE FOR EFFICIENT ATOMIC MEMORY MODIFICATION IN CONCURRENT COMPUTER SYSTEMS

(75) Inventor: David R. Cheriton, Palo Alto, CA (US)

(73) Assignee: David R. Cheriton, Palo Alto, CA (US)

( * ) Notice: Subject to any disclaimer, the term of this patent is extended or adjusted under 35 U.S.C. 154(b) by 664 days.

(21) Appl. No.: 12/804,901

(22) Filed: Jul. 29, 2010

Related U.S. Application Data

(60) Provisional application No. 61/273,178, filed on Jul. 31, 2009.

(51) Int. Cl.
*G06F 17/30* (2006.01)
(52) U.S. Cl.
CPC ................................ *G06F 17/30371* (2013.01)
(58) Field of Classification Search
CPC .......... G06F 3/04855; G06F 17/30014; G06F 17/30554; G06F 12/0223; G06F 12/023; G06F 12/0261; G06F 12/10; G06F 12/109; G06F 2212/1044
See application file for complete search history.

(56) References Cited

U.S. PATENT DOCUMENTS

| 2003/0009636 | A1* | 1/2003 | Zahir | 711/141 |
| 2004/0068501 | A1* | 4/2004 | McGoveran | 707/8 |
| 2005/0198030 | A1* | 9/2005 | McKenney | 707/8 |
| 2006/0161919 | A1* | 7/2006 | Onufryk et al. | 718/102 |
| 2007/0027870 | A1* | 2/2007 | Kim et al. | 707/8 |
| 2007/0208693 | A1* | 9/2007 | Chang et al. | 707/2 |
| 2009/0112789 | A1* | 4/2009 | Oliveira et al. | 707/1 |

* cited by examiner

*Primary Examiner* — Dinku Gebresenbet
(74) *Attorney, Agent, or Firm* — Van Pelt, Yi & James LLP

(57) ABSTRACT

Atomically updating an in-memory data structure that is directly accessible by a processor includes comparing old information associated with an old version of the in-memory data structure with current information associated with a current version of the in-memory data structure; in the event that the old information and the current information are the same, replacing the old version with a new version of the in-memory data structure; in the event that the old information and the current information are not the same, determining a difference between the current version of the in-memory data structure and the new version of the in-memory data structure, and determining whether the difference is logically consistent; and in the event that the difference is logically consistent, merging a change in the current version with the new version.

20 Claims, 9 Drawing Sheets

MERGE-UPDATE FOR EFFICIENT ATOMIC MEMORY MODIFICATION IN CONCURRENT COMPUTER SYSTEMS

CROSS REFERENCE TO OTHER APPLICATIONS

This application claims priority to U.S. Provisional Patent Application No. 61/273,178 entitled MERGE-UPDATE FOR EFFICIENT ATOMIC MEMORY MODIFICATION IN CONCURRENT COMPUTER SYSTEMS filed Jul. 31, 2009 which is incorporated herein by reference for all purposes.

BACKGROUND OF THE INVENTION

In concurrent computer systems, race conditions may occur when multiple concurrent processes update the same or related memory locations simultaneously. Race conditions leave the memory state inconsistent relative to software requirements. For example, if two processes add entries to a software data structure such as a hash table simultaneously, both mapping to the same hash bucket, the result may be a corrupted linked list in that hash bucket.

One well-known approach to solve the race condition problem is to use locks. A process is required to acquire the lock before modifying the data structure and release the lock afterwards. An atomic test-and-set instruction is sometimes supported in hardware. Problems associated with locking include deadlock, priority inversion, and extra overhead of queuing on locks. Some conventional approaches such as non-blocking synchronization (NBS) and hardware transactional memory (HTM) systems address certain problems associated with locking, but other issues remain, including high memory overhead and operational inefficiencies due to conflicting access.

BRIEF DESCRIPTION OF THE DRAWINGS

Various embodiments of the invention are disclosed in the following detailed description and the accompanying drawings.

DETAILED DESCRIPTION

Figure 1:
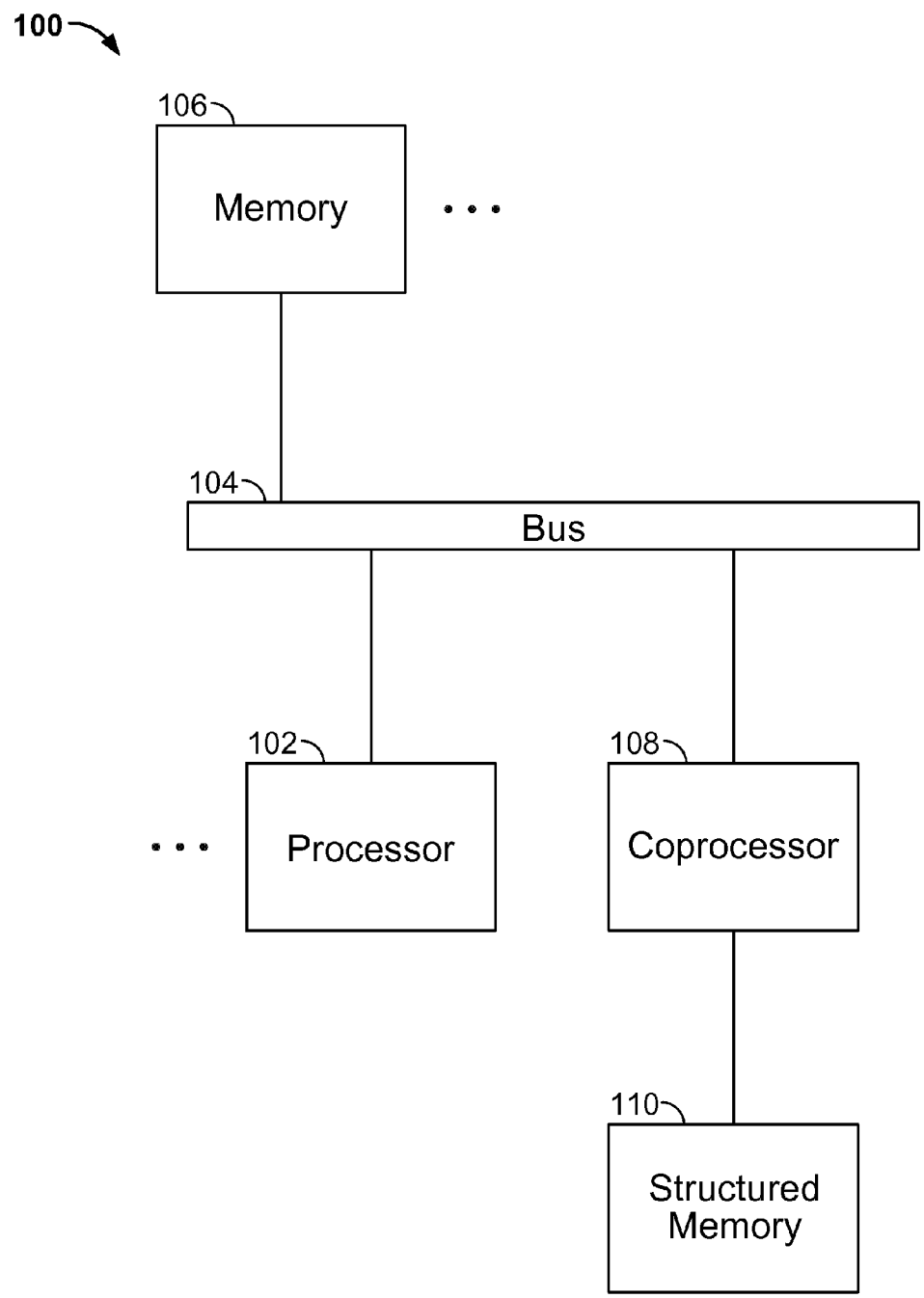
FIG. 1 is a block diagram illustrating an embodiment of a system for a structured memory coprocessor.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An atomic merge-update operation in concurrent computer systems is described. The operation allows concurrent updates to be merged even when there is conflict from modifications by different threads or processes, so long as the conflict is logically consistent. In some embodiments, an updating process or thread maintains a copy of the original data structure at the beginning of an update operation or a logical transaction and performs updates on the copy. On completion of the updates, information (such as a pointer) associated with the original data structure is compared with information associated with the current version of the data structure. If they point to the same structure, there are no conflicting updates and a compare-and-swap (CAS) operation is performed to replace the original version with a new, modified version of the data structure. If, however, the original data structure is different from the current data structure, updates of the current data structure can be merged into the new, modified version as long as the differences are logically consistent. Logically consistent differences are concurrent modifications by different threads or processes that can be resolved to arrive at a memory state that is predictable. When logically consistent modifications made by multiple threads to a memory structure are merged, it is as though each thread or process has made its modifications to the memory structure atomically and independently. As will be explained in greater detail below, for different types of data, there are different ways of determining whether modifications are logically consistent. In some embodiments, logical consistency is determined using logical consistency constraints selected from among a set of potential constraints. Once the differences are merged, the CAS operation is retried.

If the differences are not logically consistent, such as when two current processes each attempting to add an entry to a map with the same key, the merge-update operation fails and some operations are retried.

Structured memory is used in some embodiments to support the merge-update operation. Structured memory is immutable, copy-on-write memory. To reduce the cost of multiple copies or versions of the same data, some implementations of structured memory implement automatic data deduplication and compaction. For example, in U.S. Pat. No. 7,650,460 entitled HIERARCHICAL IMMUTABLE CONTENT-ADDRESSABLE MEMORY PROCESSOR and copending U.S. patent application Ser. No. 12/784,268 entitled STRUCTURED MEMORY COPROCESSOR filed May 20, 2010, which are incorporated herein by reference for all purposes, a Hierarchical Immutable Content Addressable Memory Processor (HICAMP) architecture utilizing structured memory is disclosed. In the examples below, hardware systems employing the HICAMP architecture are discussed extensively for purposes of illustration. The techniques discussed are applicable to other processor and structured memory architectures.

FIG. 1 is a block diagram illustrating an embodiment of a system for a structured memory coprocessor. In the example shown, processor 102 is coupled to link 104, which is itself coupled to a memory 106 and coprocessor 108. Coprocessor 108 is also coupled to a structured memory 110. In some embodiments (not shown), the structured memory 110 is a subset of memory 106, and coupled to coprocessor 108 through the link 104. There may be a plurality of processors and/or memories.

Processor 102 may be any processor with an established instruction set architecture; for example the Intel Xeon™, AMD Opteron™, or another processor with the Intel x86™ instruction set architecture. Link 104 may be any memory bus, including a memory-coherent high-performance external bus; for example, the AMD cHT bus and Intel QPI bus. Memory 106 may be any form of storage of state, for example non-volatile or volatile memory, dynamic or static memory, or any memory of varying mutability, accessibility, performance or capacity. Two examples of memory 106 include a dynamic random-access memory ("DRAM") used for per processor or system-wide primary storage or a static random-access memory ("SRAM") for processor or system-wide caching. Coprocessor 108 gives processor 102 access to structured memory 110, for example HICAMP. In some embodiments (not shown), the coprocessor implements structured memory within memory 106 instead of having a dedicated memory shown as 110 in FIG. 1.

In some embodiments, the coprocessor is implemented effectively as a version of a HICAMP processor, but extended with a network connection, where the line read and write operations and "instructions" are generated from requests over a Hyper Transport bus rather than local processor cores. The combination of the Hyper Transport bus interface module and region mapper simply produces line read and write requests against an iterator register, which then interfaces to the rest of the HICAMP memory system/controller 110. In some embodiments, coprocessor 108 extracts VSIDs from the (physical) memory address of the memory request sent by the processor 102.

In some embodiments, the coprocessor includes a processor/microcontroller to implement, for example, notification, merge-update, and configuration in firmware, thus not requiring hard logic.

Each coprocessor context is assigned a separate page location in the physical address space so it can be allocated and mapped by the operating system ("OS"), thereby allowing the process to write directly. Thus, an OS process is coupled to a coprocessor context and can only perform instructions on the regions/iterator registers within that context. In this way, protection between processes is preserved in the coprocessor.

Each of the iterative operations, for example indexed-join or make-inverted-index, can be implemented as a firmware-driven iteration using basic HICAMP operations. This is in contrast to a dedicated HICAMP processor, where iterative operations are implemented by a loop instruction, looping over the basic instructions to read and write through iterator registers.

Notifications are generated by the iterator register comparing lines against the previous segment, as required for merge-update. If a line differs from the previous segment, for example it is currently committed; a notification record is queued for each processor that is interested. A merged line is produced if the segment is flagged as merge-updatable and the new and old lines can be merged.

In some embodiments of the HICAMP architecture, the physical memory is organized as an array of small fixed-size lines. Each line is addressed by a physical line identification (PLID) and has a unique content that is immutable for the life of the line. The memory is accessed as a number of segments, where each segment is structured as a directed acyclic graph ("DAG") of memory lines. A segment table maps each segment to the PLID that represents the root of the DAG. Segments are identified and accessed by segment identifiers ("SegID"). Special-purpose registers in the processor (referred to as iterator registers) allow efficient access to data stored in the segments, including loading data from the DAG, iteration, prefetching, and updates of the segment contents.

Content-Unique Lines

In some embodiments, HICAMP memory is divided into lines, each with a fixed size, for example 16, 32, or 64 bytes. Each line has a unique content that is immutable during its life time. Uniqueness (also referred to as deduplication) and immutability of lines is guaranteed and maintained by a duplicate suppression mechanism in the memory system. In particular, the memory system can either read a line by its PLID, similar to a read operation in a conventional memory system, as well as look up by content, instead of writing. Look up by content operation returns a PLID for the memory line, allocating a line and assigning it a new PLID if such content was not present before. When the processor needs to modify a line, to effectively write new data into memory, it requests a PLID for a line with the specified/modified content.

In some embodiments, PLIDs are a hardware-protected data type to ensure that software cannot create them directly. Each word in the memory line and processor registers has tags which indicate whether it contains a PLID and software is precluded from directly storing a PLID in a register or memory line. In some embodiments, the tags for words in the memory lines are stored in the ECC bits, using bits that are not strictly needed for adequate ECC, for example commodity DRAM chips with ECC contain 8 ECC bits per 64-bit of data yet for 16-byte lines 9 ECC bits are sufficient to implement standard single-error-correcting-double error-detecting ("SEC-DED") code, leaving 7 bits to store the tags.

Consequently, HICAMP provides protected references in which an application thread can only access content that it has created or for which the PLID has been explicitly passed to it.

Segments

Figure 2A:
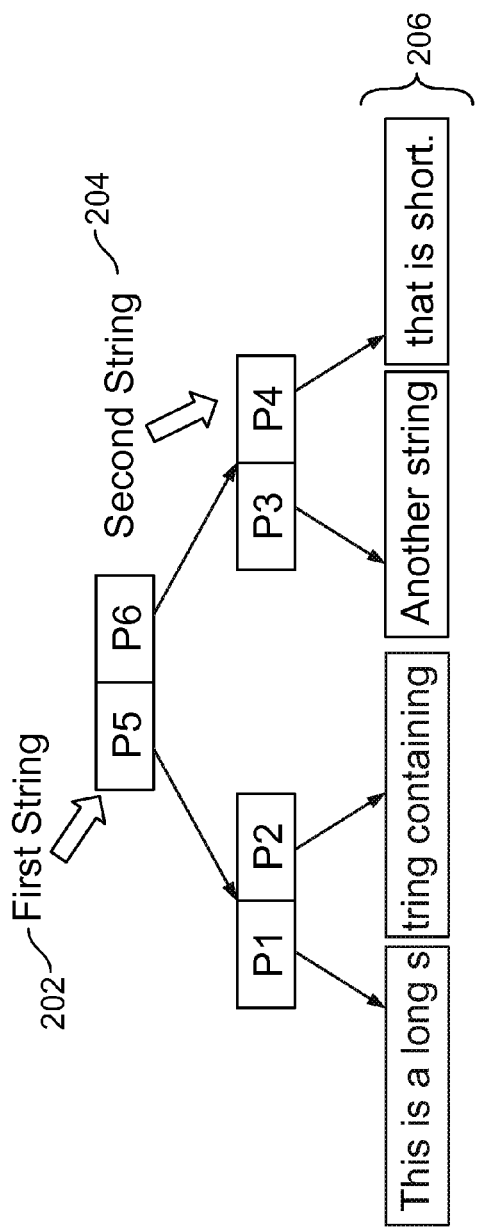
FIGS. 2A-2B are data structure diagrams illustrating examples of directed acyclic graph (DAG) structures.

A variable-sized, logically contiguous block of memory in HICAMP is referred to as a "segment" and is represented as a DAG constructed of fixed size lines as illustrated in FIG. 2A. FIG. 2A shows two memory segments 202 and 204 representing two strings, the second one 204 being a substring of the first 202. Note that the second string shares all the lines of the first string, given the latter is a substring of the former. The data elements are stored at the leaf nodes (also referred to as leaf lines) 206 of the DAG.

Each segment follows a canonical representation in which leaf lines are filled from the left to right. As a consequence of this rule and the duplicate suppression by the memory system, each possible segment content has a unique representation in memory. In particular, if the character string of FIG. 2A is instantiated again by software, the result is a reference to the same DAG which already exists. In this way, the content-uniqueness property is extended to memory segments. Furthermore, two memory segments in HICAMP can be compared for equality in a simple single-instruction comparison of the PLIDs of their root lines, independent of their size.

When contents of a segment are modified by creating a new leaf line, the PLID of the new leaf replaces the old PLID in the parent line. This effectively creates new content for the parent line, consequently acquiring a new PLID for the parent and replacing it in the level above. Continuing this operation, new PLIDs replace the old ones all the way up the DAG until a new PLID for the root is acquired.

Each segment in HICAMP is "copy-on-write" because of the immutability of the allocated lines; that is, a line does not change its content after being allocated and initialized until it is freed because of the absence of references to it. Consequently, passing the root PLID for a segment to another thread effectively passes this thread a snapshot and a logical copy of the segment contents. Exploiting this property, concurrent threads can efficiently execute with "snapshot isolation"; each thread simply needs to save the root PLID of all segments of interest and then reference the segments using the corresponding PLIDs. Therefore, each thread has sequential process semantics in spite of concurrent execution of other threads.

A thread in HICAMP (either in a stand alone HICAMP processor or a HICAMP co-processor) uses non-blocking synchronization to perform safe, atomic merge-update of a segment by:
 1. saving the root PLID for the original segment;
 2. modifying the segment updating the contents and producing a new root PLID; and
 3. using a merge compare-and-swap ("MCAS") instruction or similar to atomically replace the original root PLID with the new root PLID if the root PLID for the segment has not been changed by another thread, or if it has, optionally merge modifications that are logically consistent.

Figure 2B:
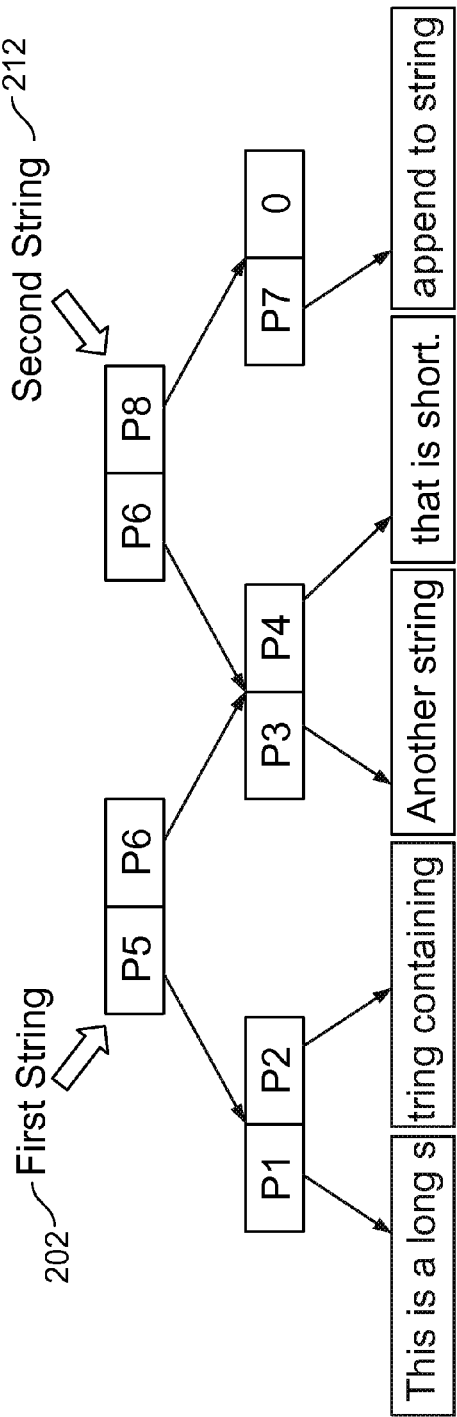

Because of the line-level duplicate suppression, HICAMP maximizes the sharing between the original copy of the segment and the new one, making copying inexpensive and MCAS practical. For example, if the second string in FIG. 2A was modified to add the extra characters "append to string", the memory as shown in FIG. 2B then contains the segment 212 corresponding to the second string, sharing all the lines of the original segment, and simply extends with additional lines to store the additional content and the extra internal lines necessary to form the DAG.

Segment Map

A HICAMP segment is referenced in software using a SegID, which is mapped to the corresponding PLID, through a segment map. In some embodiments, this map is implemented in the conventional part of the memory, indexed by SegID with each entry containing:
 [rootPLID,height,flags]
and fitting into a single memory line. The rootPLID indicates the physical line ID for the root node of the segment DAG and the height indicates the height or logical height. Flags are used to indicate read-only access, merge-update or to indicate a weak reference, for example, ones that should be zeroed when the segment is reclaimed, rather than prevent its reclamation. Each word in the line is further tagged as being a SegID or PLID.

Objects at the software level are mapped into distinct segments, where the object data is stored in the leaves of the DAG representing the segment. Other objects referring to this object, for example O1, store its corresponding SegID, S1. When the contents of O1 are updated, the entry in the segment map corresponding to S1 is updated to point to the new rootPLID of its DAG, and thus the other referencing objects do not have to change their references.

This mapping acts as a fine-grain page table and virtual memory mechanism in a conventional architecture. However, the "address translation" only occurs on the first access to the segment, not on every access to each data element. In this vein, there is no need for conventional address translation in HICAMP because inter-process isolation is achieved by the protected references. In particular, a process can only access data that it creates or it is passed a reference to. Moreover, a reference such as a SegID can be passed as read-only, restricting the process from updating the rootPLID in the corresponding segment map entry. Thus, a thread can efficiently share objects with another threads by simply passing the SegID, while ensuring that the other threads cannot modify the object, achieving the same protection as separate address spaces but without the interprocess address copying, marshaling and demarshaling, and duplication forced by conventional virtual memory systems.

In HICAMP, memory accesses go through special registers referred to as iterator registers. An iterator register effectively points to a data element in a segment. It caches the path through the segment from the root PLID of the DAG to the element it is pointing to, as well as element itself, ideally the whole leaf line. Thus, an ALU operation that specifies a source operand as an iterator register accesses the value of the current element the same way as a conventional register operand. The iterator register also allows its current offset, or index within the segment, to be read.

Iterator registers support a special increment operation that moves the iterator register's pointer to the next or next non-null element in the segment. In HICAMP, a leaf line that contains all zeroes is a special line and is always assigned PLID of zero. Thus, an interior line that references this zero line is also identified by PLID zero. Therefore, the hardware can easily detect which portions of the DAG contain zero elements and move the iterator register's position to the next non-zero memory line. Moreover, caching of the path to the current position means that the register only loads new lines on the path to the next element beyond those it already has cached. In the case of the next location being contained in the same line, no memory access is required to access the next element.

Using the knowledge of the DAG structure, the iterator registers can also automatically prefetch memory lines in response to sequential accesses to elements of the segment. Upon loading the iterator register, the register automatically prefetches the lines down to and including the line containing the data element at the specified offset.

Figure 3:
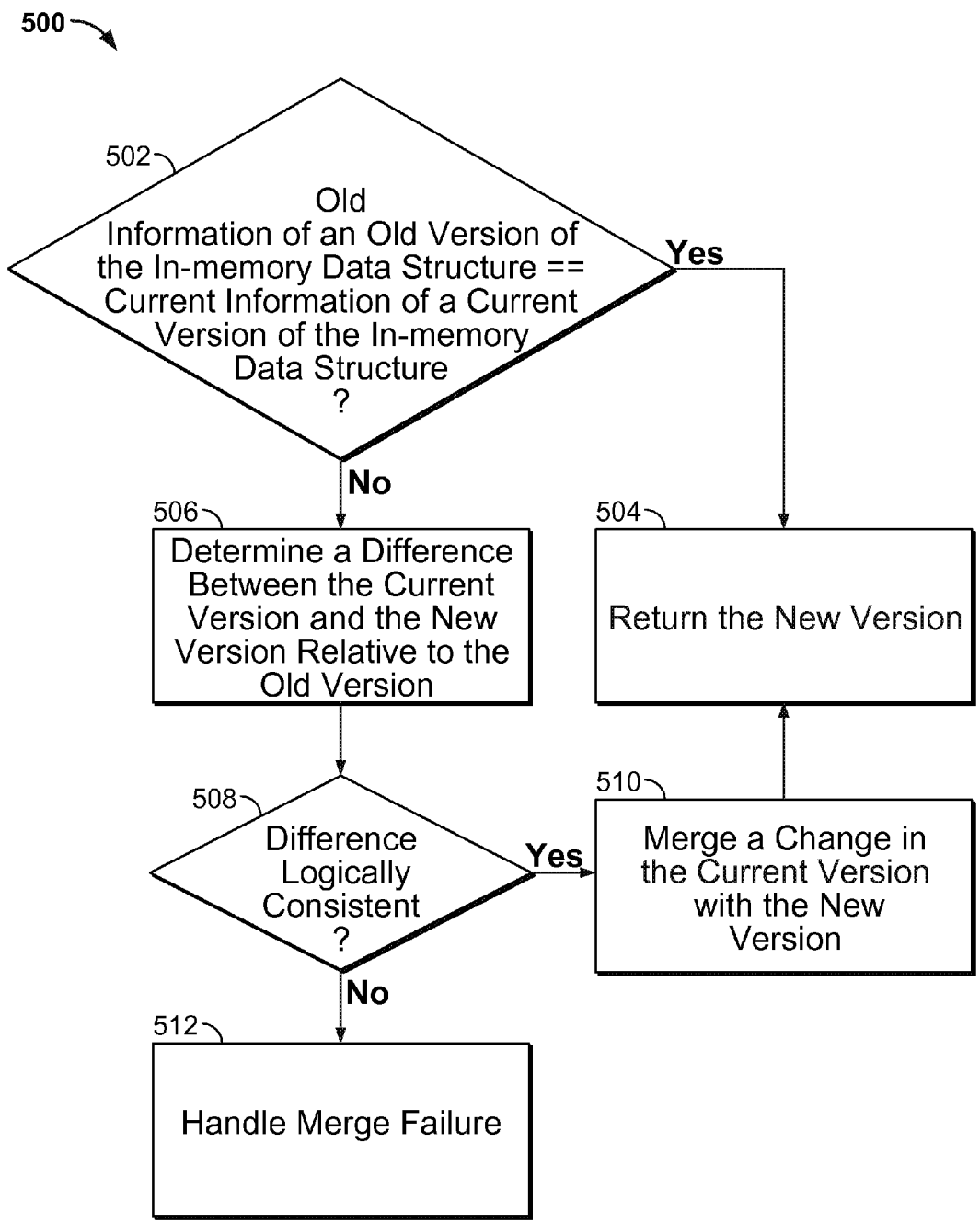
FIG. 3 is a flowchart illustrating an embodiment of a merge-update process.
Figure 4A:
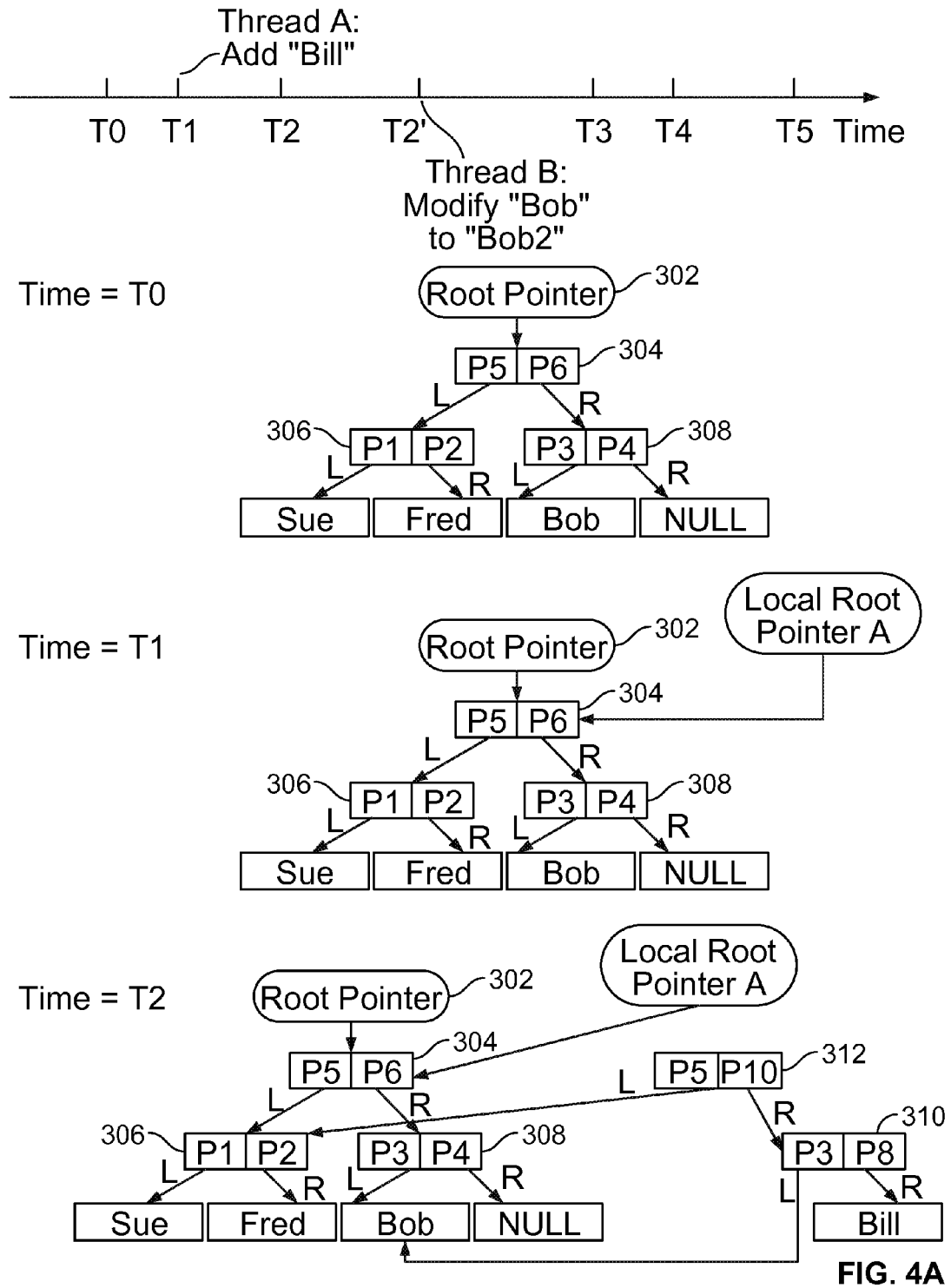
FIGS. 4A-4B and 5A-5B are data structure diagrams illustrating an example process for atomically merging and updating an in-memory data structure that is directly accessible by a processor.
Figure 4B:
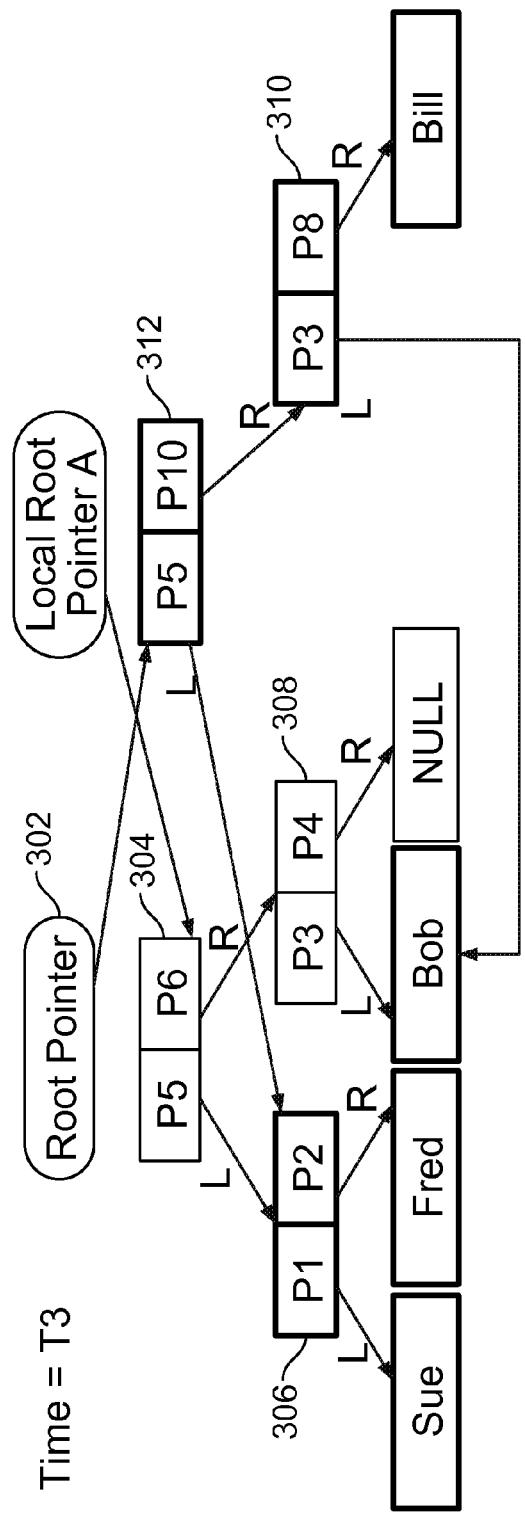

FIG. 3 is a flowchart illustrating an embodiment of a merge-update process. Merge-update operation 500 may be performed on a system such as 100 of FIG. 1, by an executing thread or process to merge any change made by another thread or process to the same in-memory data structure.

In this example, the in-memory data structure is an immutable data structure such as the DAG structure described above. Prior to the merge-update process, the executing thread or process logically makes a copy (also referred to as a new version) of the data structure being updated, by saving the address of which in a new version pointer. Any modification by the executing thread or process is made in the new version. The original data structure is referred to as the old version.

At 502, old information associated with an old version of the in-memory data structure is compared with current information associated with a current version of the in-memory data structure. In some embodiments, an old pointer pointing to the old version of the DAG and a current pointer pointing to a current version of the DAG are compared. In other embodiments, other types of information, such as identifiers, references, handles, may be used to carry out the comparison. In these embodiments, the original DAG structure is unmodified and its address is saved as the old pointer, and the current pointer can point to the same DAG structure as the original or a copy of a DAG structure if a different thread or process has attempted to make modifications to the DAG structure concurrently as the executing thread or process.

If it is determined that the old information and the current information are the same, the new version of the in-memory data structure is returned at 504. In this situation, no conflicting modification has been made by another thread and a normal CAS operation is performed by replacing the old version with the new version.

If, however, the old information is different from the current information, there is conflicting updates to the same DAG by a different thread, and merge-update is required. At 506, differences between the current version (which is modified by the other thread) and the new version (which is modified by the executing thread) relative to the old version are determined. In some embodiments, the determination is made recursively on subtree pointers until equal pointers are detected or the leaf nodes are reached.

At 508, it is determined whether the differences are logically consistent; in other words, whether the differences can be resolved without leaving the memory in an unpredictable state. Examples illustrating logically consistent differences are described in detail below. If the differences are logically consistent, the changes in the current version are merged with the new version at 510. At 504, the new version is returned. Upon receiving the returned new version, a CAS operation takes place and the root pointer switches from pointing to the current version to pointing to the new version.

If, however, the differences are not logically consistent and the changes cannot be merged atomically, at 512, merge failure is handled. For example, a failure indicator is returned, the operations by the executing thread or process are rolled back all the way up to the application level, and the thread or process may retry the same operations.

In some embodiments, the merge-update process described above is applicable only to certain data structures. Thus, prior to 502, the processor checks to determine whether the merge-update operation may be executed on the data structure. In some embodiments, eligible data structures are marked with a flag, a tag, a marker, or any other appropriate indicator to facilitate the determination. The indicator may be stored in a register in hardware and checked by the processor to determine whether the data structure is eligible for merge-update.

In this example, the in-memory data structure that is updated is directly accessible by a processor and steps described are carried out in hardware.

FIGS. 4A-4B and 5A-5B are data structure diagrams illustrating an example process for atomically merging and updating an in-memory data structure that is directly accessible by a processor. The diagrams show the in-memory data structures used during the merge-update operation, at times T0-T5. The merge-update process of FIG. 3 is illustrated in connection with FIGS. 4A-4B and 5A-5B.

At time T0, the original data structure 300 (i.e., old version) is shown. For purposes of illustration, the data structure is shown as a simple DAG with a height of 3. Each PLID is shown to have a left pointer and a right pointer, which may point to other PLIDs or leaf lines. In the example shown, each leaf line is a fixed block of memory that stores a string. A root pointer 302 points to the top level PLID 304, which in turn points to PLIDs 306 and 308. The left and right pointers of PLID 306 point to leaf lines "Sue" and "Fred", respectively. The left and right pointers of PLID 308 point to "Bob" and a NULL leaf line, respectively. In this example, the strings are zero-terminated to the right.

At time T1, thread A attempts to add a string "Bill" to the data structure at offset 3. Initially, thread A makes a copy of the root pointer's data structure for making modifications. In other words, thread A creates a local root pointer A that points to the same PLID, 304, as root pointer 302. By using the structured memory, the cost of a "copy" is the same as making a pointer, which is inexpensive computationally. The processor looks up this entry at offset 3 in the DAG, starting from the local root pointer, using techniques such as ones described in U.S. Pat. No. 7,650,460 entitled HIERARCHICAL IMMUTABLE CONTENT-ADDRESSABLE MEMORY PROCESSOR and co-pending U.S. patent application Ser. No. 12/784,268 entitled STRUCTURED MEMORY COPROCESSOR filed May 20, 2010, which are incorporated herein by reference for all purposes. In this example, the lookup operation for "Bill" indicates that the entry "Bill" should be added to the right of "Bob". Thus, at T2, a leaf line with the string "Bill" is requested from the memory controller. Since the leaf lines of the DAG are immutable, a line containing the revised content is requested from the memory system for each line that differs in the new DAG. Here, a new PLID 310 is created based on PLID 308, where the left pointer points to existing leaf line "Bob", and the right pointer points to the leaf line containing "Bill". When the new PLID/leaf lines are added, a new DAG is generated accordingly. A new PLID 312 is generated as the parent of PLIDs 306 and 310. While new PLIDs and new relationships are formed to construct a new DAG, any portion of the old DAG that is unchanged, such as PLID 306, is preserved and reused, thus allowing the new DAG to be created efficiently and reducing computation overhead significantly.

At T3, it is determined whether the pointer to the old version of the data structure (i.e., root pointer 302) is the same as the pointer to thread A's current version of the data structure (i.e., local root pointer A). This corresponds to 502 of process 500. In this example, the two values are the same, indicating that the old data structure has not been modified by another thread and thread A has run atomically, and 504 of process 500 can be executed. Thus, the root pointer is set to point to the new DAG with top level PLID 312 and the old DAG is replaced. In other words, a CAS operation is completed. The PLIDs in the new directory (306, 312, and 310) and their corresponding leaf lines are illustrating using heavy lines in the figure.

Figure 5A:
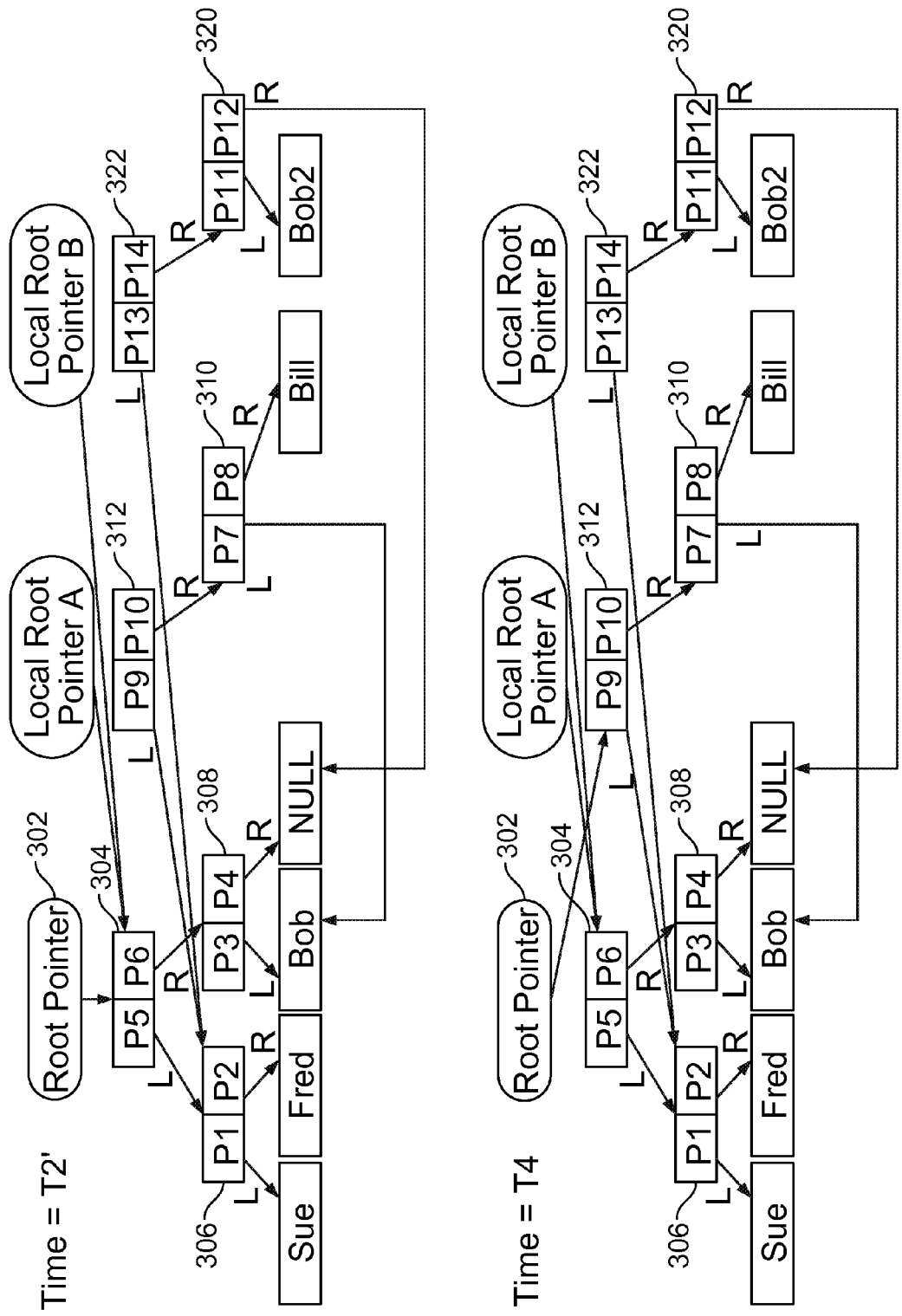
Figure 5B:
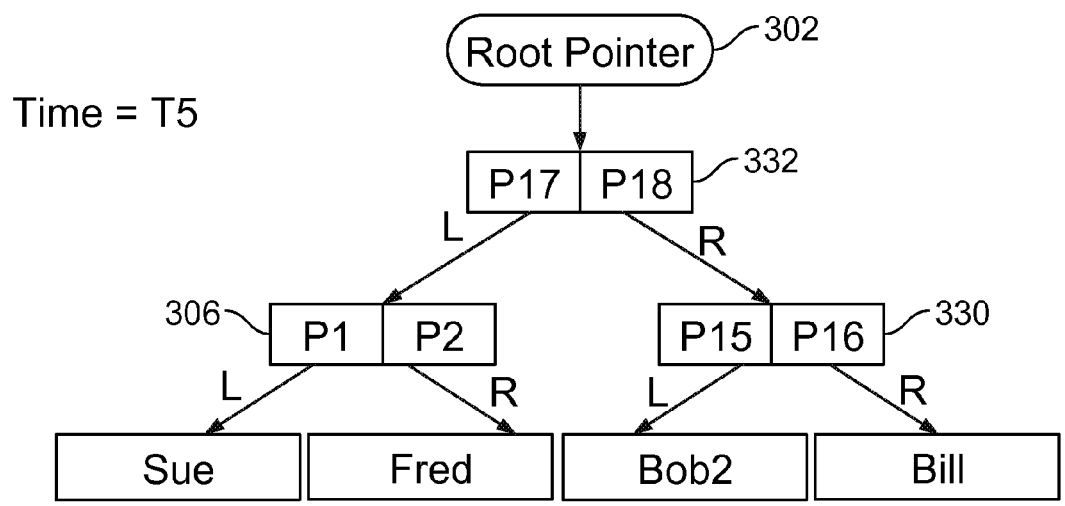

FIGS. 5A-5B are data structure diagrams illustrating a merge-update of changes to the same data structure from multiple threads. Assume that at T2', which occurs after thread A has begun to add "Bill" to the data structure (T1) but before the update is committed (T3), another thread B attempts to change the value of "Bob" to "Bob2". Thread B makes a copy of the original DAG data structure by creating a local root pointer B that points to the same PLID as root pointer 302. At this point, root pointer 302 is still pointing to PLID 304. A new, modified DAG is created by thread B. Specifically, a new PLID 320 based on PID 308 is created. The left pointer of PLID 320 points to the left leaf line with the modified value "Bob2" and the right pointer points to NULL.

A new parent PLID 322 based on node 304 is also created, pointing to original PLID 306 with its left pointer and new PLID 320 with its right pointer.

As described above in connection with FIGS. 4A and 4B, and 502-504 of process 500, at T3, a CAS operation takes place and the root pointer points to the new data structure created by thread A, with top level PID 312.

At time T4, thread B completes its updates and attempts to merge the changes. For purposes of clarity, in this example, from the perspective of thread B, the DAG with top level PLID 304 is referred to as the old or original version since it is what the root pointer originally pointed to, the DAG with top PLID 312 is referred to as the current version since the root pointer currently points to it, and the DAG with top PLID 322 is referred to as the new or modified version since it is created by thread B for making modifications. At T4, according to 502 of process 500, it is determined whether the old DAG is the same as the current DAG. In this case, the DAGs are different—root pointer 302 currently points to PLID 312 while the old pointer points to PLID 304. This difference indicates that the old DAG has been modified by another thread, namely thread A. Due to this conflict, a conventional CAS operation of the old DAG and the new DAG by thread B cannot be performed. Instead of rolling back thread B's operations, a merge-update operation takes place.

The merge-update operation is an iterative operation that compares the values of the old DAG and the current DAG and determines the differences between the current version and the new version. Any logically consistent difference is merged according to 510 and 504 of process 500; any logically inconsistent difference is handled as a merge failure according to 512 of process 500.

In this example, the left pointer of old PLID 304 is compared with the left pointer of the current PLID 312. Both pointers point to PLID 306, as does the left pointer of the corresponding new PLID 322. This indicates that PLID 306 has not been modified and no further comparison is needed. The detection of equivalent high level PLIDs in the current DAG and the new DAG can significantly reduce the amount of the tree to be processed.

Similarly, the right pointer of old PLID 304 is compared with the right pointer of the current PLID 312. The former points to PLID 308 and the latter points to PLID 310. The merge-update operation iterates and the left pointers of PLIDs 308 and 310 are compared. Since they both point to the same leaf line "Bob", the value of the corresponding new PLID 320's left pointer, "Bob2", is determined to be the new left leaf line.

The right pointers of PLIDs 308 and 310 are also compared. Since these pointers point to different leaf lines, and right pointer of the corresponding new PLID 320 points to NULL, the current value "Bill" is set as the value pointed to by the right pointer of new PLID 320.

At time T5, merge-update is completed according to 510-504 of process 500. A new DAG is constructed, with a new parent PLID 330 being requested for leaf lines "Bob2" and "Bill", and a higher level parent PLID 332 being requested for PLIDs 306 and 330. The root pointer of the data structure points to this new DAG, which includes merged changes from threads A and B. The final DAG is shown in FIG. 5B. When the threads finish their operations and exit, any PLIDs or leaf lines no longer referenced by a valid pointer will eventually be garbage collected.

In the above example, the modifications by thread's A and B are logically consistent. In this case, the consistency constraint is that at least one of a current version of a leaf line and a new version of the leaf line is a NULL pointer. In other words, concurrent threads have not changed both the current and the new copies of the same leaf node to different non-NULL values. Such changes made by threads A and B concurrently are deemed logically consistent since they result in the same memory state as changes made by the individual threads executing atomically. In other words, the resulting memory is in a predictable state. In some embodiments, a special value is used to distinguish a pointer that has been cleared/modified to NULL from a pointer that points to NULL.

Had the threads both tried to logically modify the same leaf entry to different non-NULL values (for example, thread A attempts to modify "Sue" to "Sue2" and thread B attempts to modify "Sue" to "Sue3") and both operations been allowed to succeed, the atomicity of the application operation would be violated. In particular, both thread A and thread B could expect to change the entry based on it being "Sue" at the start of their operations yet it then would have been "Sue2" logically at the time that thread B completed its update by merge-update. In this case, the merge must fail and later thread rolls back and retries its operations as described above in connection with 512 of process 500.

In some embodiments, logically consistent changes involve changes made to values such as counters or indices. For example, two threads may concurrently attempt to increment the same packet counter in a networking application. The changes can be merged in a logically consistent manner by taking the difference between the new value and the old value, then adding the current value. Here, old, new, and current values correspond to the original value of the counter, the modified counter value by the thread, and the current value of the counter that is possibly modified by another thread, respectively. For example, a packet counter originally has a value of 100. Threads A attempts to increment the counter by 1 and thread B attempts to increment the same counter by 2 concurrently. Thread A acts first, getting its current version of the counter and incrementing the current counter value to be 101. Thread B creates its new version of the counter when the counter value is still 100 and then increments the new counter value to 102. The merged counter value is computed as follows: merged counter value=modified counter value—original counter value+current counter value In the example above, the merged counter value=102−100+101=103, which is the same as if the threads had executed atomically. Thus, the changes to the counter value are deemed logically consistent. This type of merge-update is referred to as incremental merge-update.

Another example of incremental merge-update is used for a queue that has a head pointer and a tail pointer represented by indexed pointers headPtr[i] and tailPtr[j], respectively, where i and j are respectively indices of the head and tail entries in the queue. An enqueuing operation increments the tail index, allocates a tail entry, and then updates the queue data. When multiple threads or processes concurrently perform enqueueing operations, if there is a conflict that needs to be merged, the tail index is determined as a difference between the new version of the index as modified by the thread of interest and the old version of the index, plus the current version of the index that has possibly been modified by another thread as follows:

tail index=new version of tail index−old version of tail index+current version of tail index In some embodiments, the data structure includes an indicator such as a marker or a flag to indicate that incremental merge-update is allowed so that the merge-update operation accounts for incremental merge-update in its computation.

Similarly, a dequeuing operation that increments the head index can be incrementally merged and updated by taking the difference between the new version and the old version of the index value, and adding the current version of the index.

Since there are a number of possible ways to determine whether a difference is logically consistent, in some embodiments, the determination is made by applying one or more logical consistency constraints selected from a plurality of available logical consistency constraints. The programmer or compiler may determine the appropriate logical consistency constraints based on the type of data structure used and allow for different ways of handling the merge-update operation.

The following C++ like pseudo code illustrates an implementation of a merge-update function that handles different types of data structures. In this example, each leaf line field is associated with an indicator indicating whether it is storing a pointer or a value. If a pointer is stored, merge-update fails if the current version and the new version of a leaf line are concurrently updated by multiple threads to different values. If a value is stored and that incremental merge-update is allowed for the value, the difference between the old version of the value and the new version of the value is summed with the current version of the value. Each non-leaf node has a "left" field and a "right" field, pointing to the left and right subtrees of the DAG starting at the non-leaf node. Each leaf node has a "left" field and a "right" field containing, each containing an application datum.

```
node MergeUpdate (old, cur, new) {
    if (cur == old) return new;
    if(new==old) return cur;
    if (IsLeafNodeField (cur)) {
        if (!LeafLineFieldIsPtr(cur)&& IncrementalUpdateAllowed) {
                                    //leaf line is a value and incremental
                                    //merge-update is allowed
            return new = new - old + cur;
        }
        if (cur!= new) throw exception;
        return new;
    }
    newLeft = (cur->left != new->left)?MergeUpdate (old->left, cur->left, new->left):
new->left;
    newRight = (cur->right != new->right)?MergeUpdate (old->right, cur->right, new->
right):new->right;
    return new node (newLeft, newRight);
}
```

A merge compare-and-swap (MCAS) function based on the merge-update function is implemented as follows:

```
bool MCAS (old, curAddr, new) {
    try {
        cur = *curAddr;
        while (!CAS(old, cur, new)) {         //CAS failed
            new = MergeUpdate (old, cur, new);   //attempt to merge
            old=cur;
        }
    } catch (...) {
        return false;
                                              // merge failed
    }
    return true;
}
```

The modification to a DAG may increase or decrease its height. For example, the fifth entry of the array corresponding to this DAG could be written to non-null, causing the height of the DAG to increase. Thus, the merge call should be proceeded by the following C++-like pseudo code:
    maxHt=maxHeight(oldHeight,curHeight,newHeight);
    old=adjustHeight(old,mht);
    cur=adjustHeight(cur,mht);
    new=adjustHeight(new,mht);

The adjustHeight procedure adds a new root node that points in its left field to the original root of the node (and null in the right field), thereby increasing its height, repeatedly until its height equals maxHt. It just returns the DAG passed as an argument if the current height matches maxHt. Because maxHt is the maximum height, no DAG is reduced in height.

In the above implementation, the MergeUpdate function is invoked directly by the software program. For example, multiple partial result matrices from several different threads or processes may be merged using the MergeUpdate function. Alternatively, a difference data structure that includes changes to the old version of the data structure can be explicitly generated. For example, a difference sparse array in a HICAMP architecture would store just those entries that have been modified. In some embodiments, a special value is used to distinguish a pointer that has been cleared/modified to NULL from a pointer that points to NULL. Returning to the example shown above in connection with FIGS. 5A-5B, a difference data structure may be constructed to indicate that "Bob" has been changed to "Bob2" and the leaf node to the right of "Bob" has changed from NULL to "Bill." The difference is applied to the current data structure. If a difference cannot be applied (e.g., "Sue" is changed to "Sue2" by one thread and "Sue3" by another thread), the merge fails. The pseudo code of an example implementation of MergeUpdate using a difference data structure is shown as follows:

```
MergeUpdateDiff(old, cur, dif) {
    for (all diff entries in dif) {
        newCur = apply diff entry to corresponding cur entry
        or throw exception if diff entry cannot be applied to cur entry
    }
    return newCur;
}
```

A pseudo code example of a compare-and-swap function based on MergeUpdateDiffs function (MDCAS) is illustrated as follows:

```
bool MDCAS (old, curAddr, dif) {
    try {
        do {
            cur = *curAddr;
            new = MergeUpdateDiff (old, cur, dif);
```

```
        } while (!CAS (old, cur, new));
    } catch (...) {
        return false; // merge failed
    }
    return true;
}
```

Unlike the conventional CAS, which fails whenever there is any conflict, MCAS and MDCAS both attempt to merge the conflict and only fails when the conflict is logically inconsistent and cannot be merged.

In some embodiments, a data structure may include one or more portions that are suitable for merge-update and one or more portions that are not. For example, a database table may include several fields storing the name of user, a credit card number for the user, and number of times the credit card has been used. Multiple threads or processes are permitted to perform merge-update on user names in a manner similar to what was illustrated in FIGS. 4A-5B and perform incremental merge-update on the number of times the credit card has been used. No incremental merge-update is permitted on the credit card numbers if they are treated as values, although it may be permissible to treat the credit card numbers as strings and allow merge-update so that modifications can be processed concurrently without retries. The table can be represented as a collection of three columns or arrays, one per field, each indexed by a respective table key. In some embodiments, each column or array includes a first indicator indicating whether merge-update is allowable, and a second indicator indicating whether incremental merge-update is allowable. Alternatively, a type indicator indicating whether the leaf node is a pointer or a value and an update indicator indicating whether update is allowable. Concurrent access to the segment may be merged using incremental merge-update if it is allowable; else, using merge-update if it is allowable, or not merged at all if neither merge-update nor incremental merge-update is allowed.

In some embodiments, a segment includes specific types of fields to which special merge-update policies can be applied. For example, a segment may include a field that is a list. Accordingly, a merge-update policy for this field merges the current list and the new list and eliminates any duplicate entries. As another example, a segment may include a field that is a timestamp. The corresponding merge-update policy (also referred to as an override merge-update policy) uses the later time value of the new version or the current version when both versions have changed.

Figure 6:
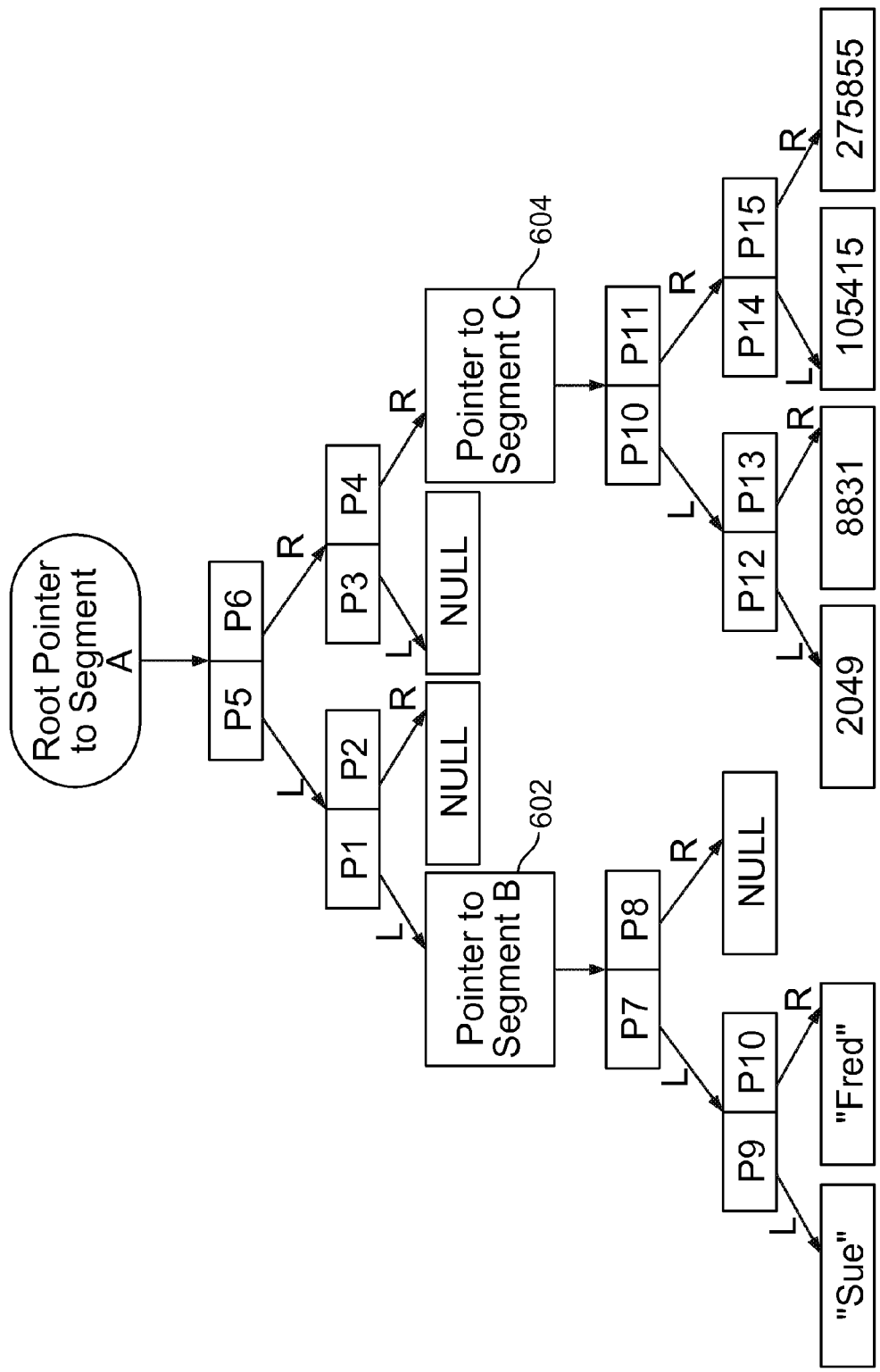
FIG. 6 is a diagram illustrating an example of a nested segment data structure.

In some embodiments, segments are nested and merge-update operations are carried out recursively. FIG. 6 is a diagram illustrating an example of a nested segment data structure. In this example, leaf nodes 602 and 604 of segment A point to segments B and C, respectively. The root pointer points to segment A, which maps keys to other segments such as B and C. Thus, segment A is referred to as the mapping segment. Since segments B and C contain actual data in its leaf nodes, they are referred to as data segments. Additional layers of nesting are permitted and different number of mapping and data segments can be used in other data structures. The mapping segment and some of its data segments are associated with indicators indicating that the segments are suitable for merge-update.

In some embodiments, the DAG leaf nodes are treated as entries in an array for purposes of merging. An example pseudocode for merging pointer leaf nodes in a nested DAG is as follows:

```
node NestedMergeUpdate (old, cur, new) {
    for (i=0; i<maxEntries; i++) {
        if (cur[i]==old[i]) continue;              //cur has not changed
        if (new[i]==old[i]) new[i]=cur[i];         //new has not changed
        if (cur[i]==new[i]) continue;              //both changed to the same value
        new[i]=RecMergeUpdate(old[i], cur[i], new[i]);
    }
}
node RecMergeUpdate (old, cur, new) {
    if (cur == old) return new;
    if(new==old) return cur;
    if (IsLeafNodeField (cur)) {
        if (!LeafLineFieldIsPtr(cur)&& IncrementalUpdateAllowed) {
                                                   //leaf line is a value and incremental
                                                   //merge-update is allowed
            return new = new – old + cur;
        }
        if (cur!= new) {
            if (cur is recursive-update) {
                new = RecMergeUpdate (old, cur, new);
            }
            else exception;
            return new;
        }
        newLeft = (cur->left != new->left)?RecMergeUpdate (old->left, cur->left, new->left):
new->left;
        newRight = (cur->right != new-> right)?RecMergeUpdate (old-> right, cur-> right, new-> right):
new-> right;
        return new node (newLeft, newRight);
    }
}
``` merge-update or incremental merge-update is allowable can be used in some embodiments.

Figure 7:
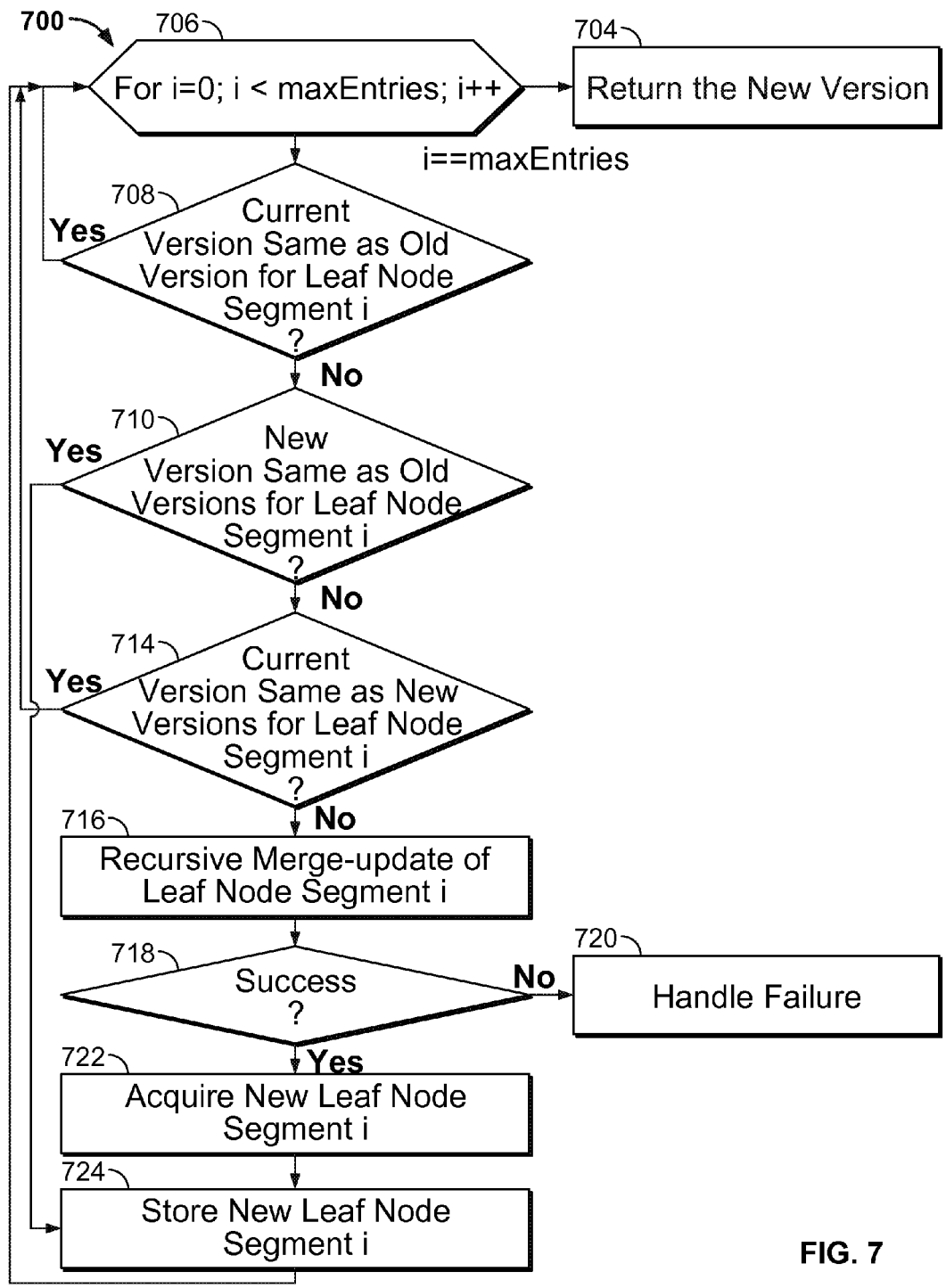
FIG. 7 is a flowchart illustrating an embodiment of a process for handling merge update of a nested DAG data structure.

In some embodiments, a segment, represented as a DAG, is associated with a field that indicates whether merge-update is allowable and more specifically whether incremental merge- FIG. 7 is a flowchart illustrating an embodiment of a process for handling merge update of a nested DAG data structure. Process 700 may be applicable to a nested data structure similar to 600 of FIG. 6. The process initiates when a thread or process is ready to commit its modifications after performing updates to the nested data structure. References to an old version, a current version, and a new version of the mapping segment are created during the update process in the manner similar to what was discussed above. Also during the update process, when a leaf node (i.e., data segment) is modified, a corresponding old version, a current version, and a new version are similarly referenced.

In this example, the leaf node segments are pointers, and the merge update process treats the leaf node segments of the data structure as entries in an array. The size of the array is denoted as maxEntries. A loop commences at 706, where the index i of the entry being processed is initialized or updated. At 708, it is determined whether the current version of leaf node segment i is the same as the old version. In some embodiments, this determination is made by comparing the physical addresses of the current and old versions that correspond to the leaf node segment. Because the segments in the DAG structure are immutable, if both the current and the old versions are the same, then the current version of the leaf node segment has not changed, the process continues and control is transferred to 706, where the index is incremented and the loop repeats. Else, control is transferred to 710, where the new version and the old version of leaf node segment i are compared. If they are the same, then the new version has not changed. Accordingly, control is transferred to 724, where the new leaf node is stored in the leaf node of the modified mapping segment to replace the old address of the data segment associated with this entry. Else, control is transferred to 714, where the current version is compared with the new version of leaf node segment i. If the current version and the new version are the same, then both the current version and the new version changed to the same value, thus control is transferred to 706 and the loop continues.

Unlike the merge-update operation discussed previously in connection with an un-nested data structure such as an un-nested DAG where a leaf node pointer that is changed in both the current version and the modified version is deemed to be logically inconsistent and causes the merge-update operation to abort, in the nested structure, when the current version and the new version of the leaf node mapping segment are both changed, a recursive merge-update is attempted on the leaf node segment at 716. The recursive merge update function follows the RecMergeUpdate pseudocode shown above, and is very similar to process 300 (the merge-update process) except that when the current version is not the same as the new version, and the current version is a pointer to a nested structure that allows recursive update, it is the RecMergeUpdate function that is recursively invoked.

If the leaf node segment allows merge-update and the merge-update is successful, at 722, a new physical address for the associated leaf node segment is acquired from the memory controller. At 724, the new leaf node is stored in the leaf node of the modified mapping segment to replace the old address of the data segment associated with this entry. The loop is then repeated. If, however, the data segment does not allow recursive merge-update or if recursive merge-update is unsuccessful, the recursive merge-update of the mapping segment fails and the failure is handled at 720.

When i reaches maxEntries, the loop finishes and the new version is returned at 704.

If the mapping segment's recursive merge-update succeeds, the current version of the mapping segment is used to replace the old version in retrying the CAS operation to commit the map segment. The commit succeeds if there is no intervening change to the current version. Otherwise, the merge-update is retried until it fails or the MCAS succeeds.

Process 700 may be performed recursively for segments with deeper nesting, by merging segments that are referenced directly or indirectly by an upper layer segment that is being merge-updated. For example, in some embodiments, object segments are referenced indirectly by virtual segment ID (VSID) through a virtual segment map that maps a VSID to the physical address of the segment data. The virtual segment acts as a mapping segment for all other segments. An atomic update across multiple segments referenced by the virtual segment map can be accomplished by: saving a copy of the current virtual segment map as the old version and a copy as the new version; performing updates to the data segments as separate copies and only modifying its new version of the virtual segment map to reference these new, separate copies; and atomically committing the updated virtual segment's mapping segment using MCAS, relying on merge-update to resolve conflicts at the mapping level as well as the data segment level if possible.

Process 700 allows concurrent update to multiple objects that is atomic. The atomic update involving multiple threads or processes is only aborted when the threads or processes have performed logically inconsistent updates at either the virtual segment map level or the data segment level. If the revised version of the virtual segment map is not committed but is aborted or released, the entries dereferencing the new data segments are dereferenced, and the revised data segments are also dereferenced and freed. Consequently, changes and memory allocations performed as part of the aborted process are undone.

Although hardware implementation of the merge-update technique is described extensively above, the technique can also be implemented in software, such as cycle-accurate and synchronous software simulation of hardware. For example, during a hardware simulation cycle, a process is programmed to read data segment state using the old version of the virtual segment map. The process only reads data that was set in the previous cycle. The process writes to data segments referenced only in the new version of the virtual segment map. At the end of the simulated hardware cycle, the software commits the changes to the new version of the virtual segment map, and maps the new state available for the next cycle. Thus, the process is programmed to only read state from a previous cycle even if it has updated the memory location within the current simulated cycle, matching the behavior of hardware flip-flops registers.

Atomic merge-update operation in concurrent computer systems has been disclosed. By allowing logically consistent modifications to structured memory to be merged, CAS operations can be efficiently performed in many situations without requiring operations to be rolled back.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for atomically updating an in-memory data structure that is directly accessible by a processor, comprising:
    comparing old information associated with an old version of the in-memory data structure with current information associated with a current version of the in-memory data structure;
    in the event that the old information and the current information are the same, replacing the old version with a new version of the in-memory data structure;

in the event that the old information and the current information are not the same, determining a difference between the current version of the in-memory data structure relative to the old version of the in-memory data structure and the new version of the in-memory data structure relative to the old version of the in-memory data structure, and determining whether the difference is logically consistent, wherein a logically consistent difference pertains to concurrent modifications to the current version of the in-memory data structure and the new version of the in-memory data structure that are resolvable to arrive at a predictable memory state; and in the event that the difference is logically consistent, merging a change in the current version with the new version.

2. The method of claim 1, further comprising, in the event that the difference is logically consistent, replacing the current version with the new version that includes the merged change.

3. The method of claim 1, wherein the old version of the in-memory data structure and the new version of the in-memory data structure are represented as directed acyclic graphs (DAGs).

4. The method of claim 3, wherein determining the difference includes comparing portions of the DAGs.

5. The method of claim 3, wherein determining the difference includes comparing portions of the DAGs and determining that at least some portions of the DAGs are identical.

6. The method of claim 1, further comprising determining all differences between the current version of the in-memory data structure and the new version of the in-memory data structure and whether the differences are logically consistent.

7. The method of claim 1, further comprising, in the event that the difference is not logically consistent, handling merge failure.

8. The method of claim 1, wherein the in-memory data structure is stored in structured memory that is immutable.

9. The method of claim 1, wherein the in-memory data structure is stored in structured memory that is deduplicated.

10. The method of claim 1, wherein whether the difference is logically consistent is determined based at least in part on a logical consistency constraint selected from a plurality of potential logical consistency constraints.

11. The method of claim 1, wherein the difference is logically consistent if at least a current version of a leaf node in the in-memory data structure or a new version of the leaf node is the same as an old version of the leaf node.

12. The method of claim 1, wherein the difference is logically consistent if a leaf node in the in-memory data structure corresponds to a value that can be incremented or decremented.

13. The method of claim 12, wherein merging the change in the current version with the new version includes evaluating a sum of a current version of the leaf node and a difference between a new version of the leaf node and an old version of the leaf node.

14. The method of claim 1, wherein determining the difference between the current version of the in-memory data structure includes receiving a difference data structure that includes entries that indicate changes between the current version of the in-memory data structure and the new version of the in-memory data structure.

15. The method of claim 1, wherein the new version of the in-memory data structure includes a difference data structure that includes changes to the old version of the in-memory data structure.

16. The method of claim 1, wherein:
the in-memory data structure includes a value; and
merging the change in the current version with the new version includes performing an incremental merge-update of the value.

17. The method of claim 1, wherein:
the in-memory data structure includes a value; and
merging the change in the current version with the new version includes performing an override merge-update of the value according to an override merge-update policy.

18. The method of claim 1, wherein:
the in-memory data structure includes a nested data structure; and
merging the change in the current version with the new version includes performing merging recursively.

19. The method of claim 1, wherein merging the change in the current version with the new version is performed in hardware.

20. A system for atomically updating an in-memory data structure that is directly accessible by a processor, comprising:
the processor configured to:
compare old information associated with an old version of the in-memory data structure with current information associated with a current version of the in-memory data structure;
in the event that the old information and the current information are the same, replace the old version with a new version of the in-memory data structure;
in the event that the old information and the current information are not the same, determine a difference between the current version of the in-memory data structure relative to the old version of the in-memory data structure and the new version of the in-memory data structure relative to the old version of the in-memory data structure, and determine whether the difference is logically consistent, wherein a logically consistent difference pertains to concurrent modifications to the current version of the in-memory data structure and the new version of the in-memory data structure that are resolvable to arrive at a predictable memory state; and
in the event that the difference is logically consistent, merge a change in the current version with the new version; and
a memory coupled to the processor and configured to provide the processor with instructions.

* * * * *